United States Patent
Rimkus et al.

(10) Patent No.: US 6,718,847 B2
(45) Date of Patent: Apr. 13, 2004

(54) PRESSURE-RELEASE DEVICE FOR A TRANSMISSION HOUSING

(75) Inventors: Manfred Rimkus, Mannheim (DE); Helmut Schäfer, Ketsch (DE)

(73) Assignee: Deere & Company, Moline, IL (US)

( * ) Notice: Subject to any disclaimer, the term of this patent is extended or adjusted under 35 U.S.C. 154(b) by 79 days.

(21) Appl. No.: 10/143,996

(22) Filed: May 9, 2002

(65) Prior Publication Data

US 2003/0006096 A1 Jan. 9, 2003

(30) Foreign Application Priority Data

Jul. 5, 2001 (DE) .......................................... 101 32 739

(51) Int. Cl.[7] .............................................. F16H 57/02
(52) U.S. Cl. ...................... 74/606 R; 74/607; 184/6.12
(58) Field of Search .............................. 74/606 R, 607; 184/6.12, 6.4, 103.1

(56) References Cited

U.S. PATENT DOCUMENTS

| | | | |
|---|---|---|---|
| 3,670,499 A | 6/1972 | Tucholski | 60/54 |
| 4,529,061 A | 7/1985 | Glasrud et al. | 184/103 R |
| 4,630,711 A | 12/1986 | Levrai et al. | 184/6.12 |
| 4,915,193 A | 4/1990 | Marquart | 184/6.12 |
| 6,123,175 A * | 9/2000 | Fett | 184/59 |
| 2002/0166411 A1 * | 11/2002 | White | 74/607 |
| 2003/0047024 A1 * | 3/2003 | Kaplan et al. | 74/606 R |

* cited by examiner

Primary Examiner—David Fenstermacher

(57) ABSTRACT

A venting or pressure release system releases pressure from a transmission housing through which extends a transmission shaft. A lower part of the transmission housing forms a collector in which fluid collect. A conduit communicates the collector with a storage container which is substantially sealed against the transmission housing. An overpressure in the transmission housing forces fluid from the collector through the conduit into the storage container. A pressure-release conduit communicates the transmission housing above the collector to the storage container. A shutoff device closes the pressure-release conduit when the transmission shaft is rotating and opens the pressure-release conduit when the transmission shaft is not rotating. This makes possible a rapid compensation of fluid after the transmission has been turned off so that the fluid level can be reliably determined. The shutoff device may be a pilot-controlled valve or a fluid barrier.

11 Claims, 2 Drawing Sheets

PRESSURE-RELEASE DEVICE FOR A TRANSMISSION HOUSING

FIELD OF THE INVENTION

The invention relates to a pressure-release device for a transmission housing through which a transmission shaft extends

BACKGROUND OF THE INVENTION

In order to avoid churn losses, it is known to pressurize the interior of a engine-driven transmission. The fluid which collects in a low-lying collection area of the transmission housing is returned to a storage container by the overpressure via a communication conduit located in the bottom area of the transmission housing. Except for the communication conduit, the transmission housing is sealed, especially where shafts enter into the housing. As a result of the overpressure in the transmission housing, a higher fluid level tends to develop in the storage container during operation than during standstill when no overpressure prevails. However, the overpressure drops only very slowly after a drive engine is shut off, so that considerable time elapses until a fluid exchange takes place via the communication conduit and a stationary fluid level is adjusted in the transmission housing and in the storage container. This time delay can result in erroneous estimations when checking the fluid level.

SUMMARY OF THE INVENTION

An object of the present invention is to provide a means for releasing an over-pressure in a transmission housing.

This and other objects are achieved by the present invention wherein a venting or pressure release system releases pressure from a transmission housing through which extends a transmission shaft. A lower part of the transmission housing forms a collector in which fluid collects. A conduit communicates the collector with a storage container which is substantially sealed against the transmission housing. An overpressure in the transmission housing forces fluid from the collector through the conduit into the storage container. A pressure-release conduit communicates the transmission housing above the collector to the storage container. A shutoff device closes the pressure-release conduit when the transmission shaft is rotating and opens the pressure-release conduit when the transmission shaft is not rotating. This makes possible a rapid compensation of fluid after the transmission has been turned off so that the fluid level can be reliably determined. The shutoff device may be a pilot-controlled valve or a fluid barrier.

DETAILED DESCRIPTION

Figure 1:
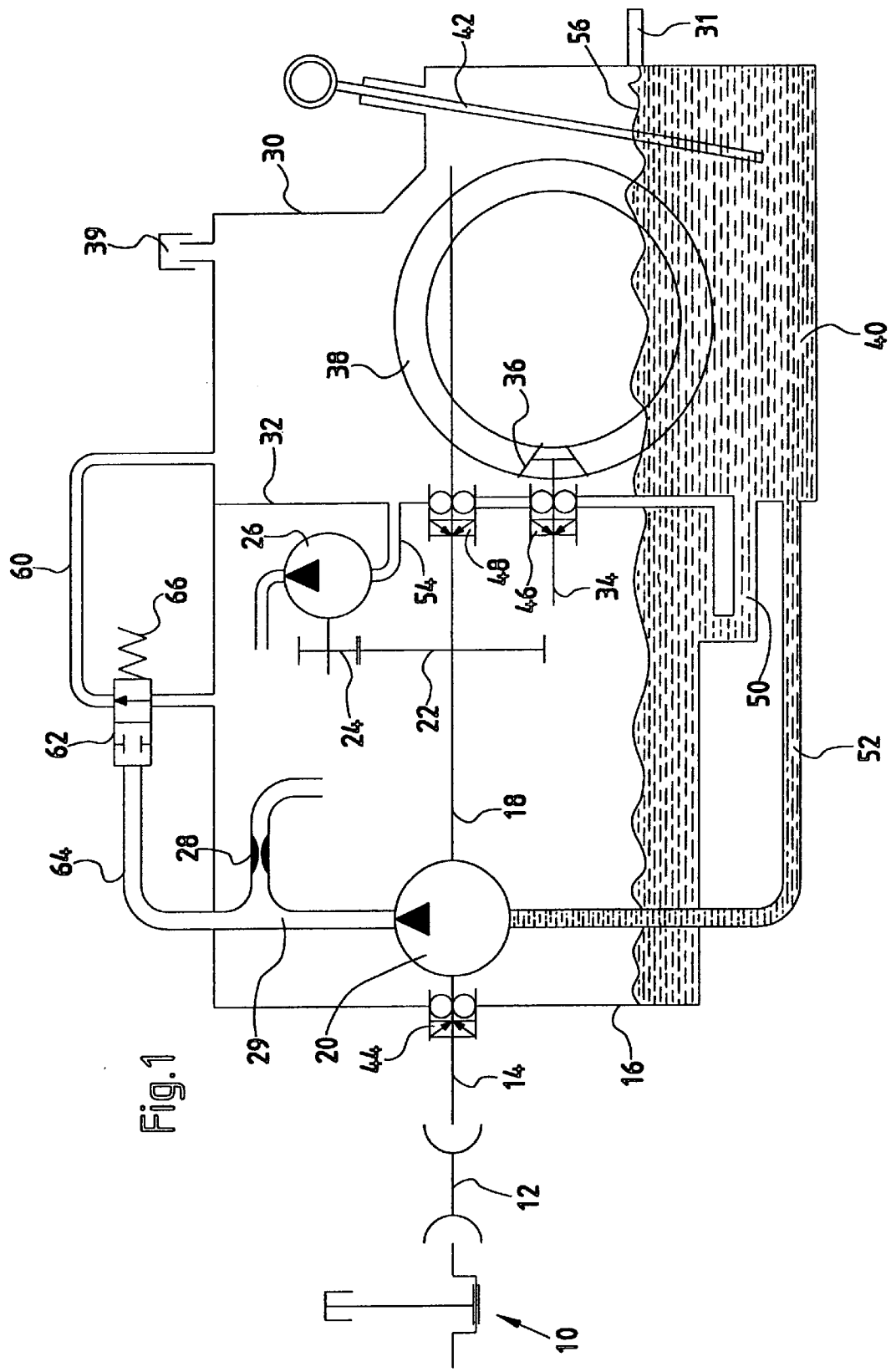
FIG. 1 is a schematic diagram of a pressure-release device for a transmission housing with a pilot-controlled valve with a non-rotating transmission shaft.
Figure 2:
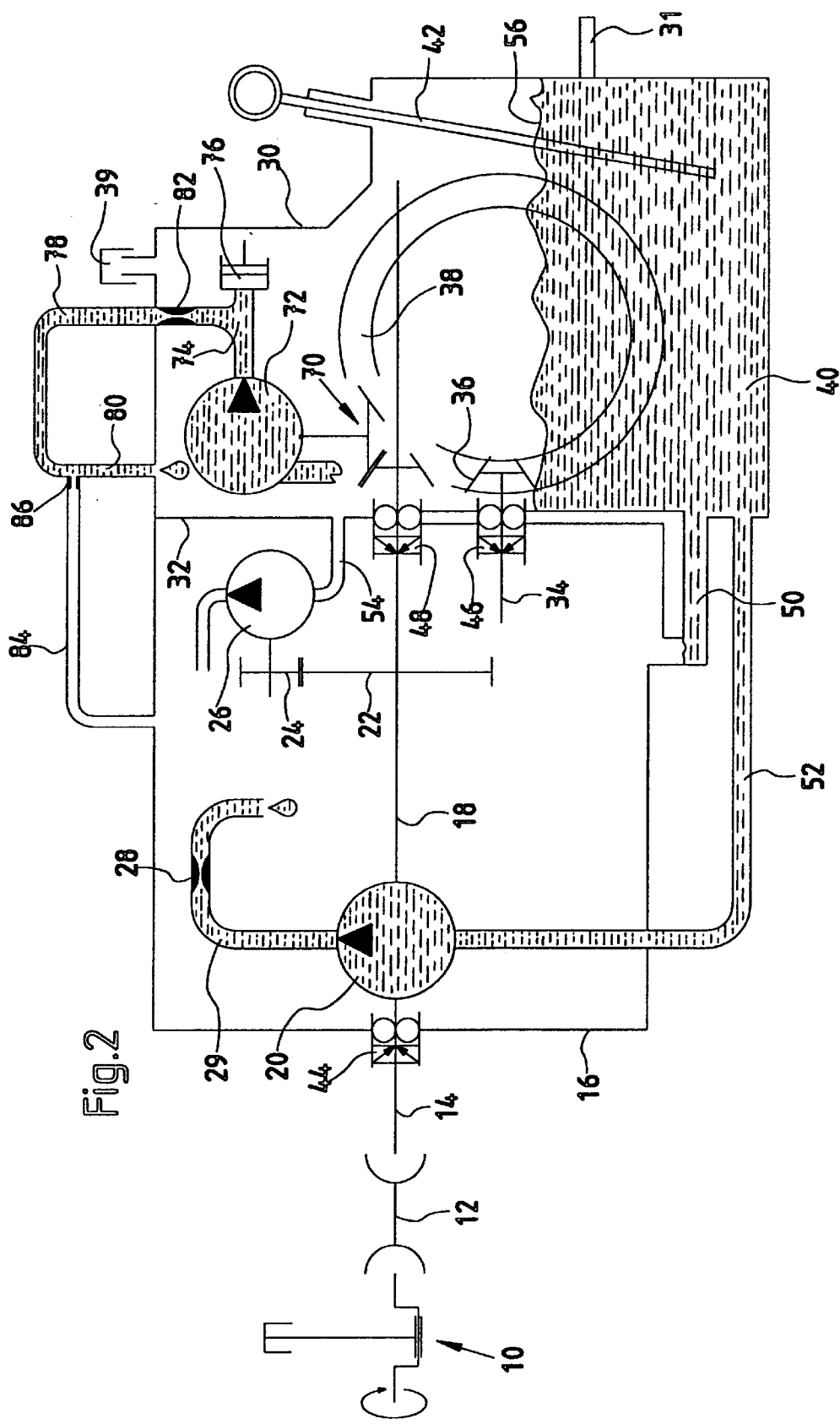
FIG. 2 is a schematic diagram of an alternate embodiment of pressure-release device for a transmission housing with a rotating transmission shaft.

FIGS. 1 and 2 each show a portion of a drive train of a work vehicle, such as a tractor. An internal combustion engine 10 drives input shaft 14 of a transmission in transmission housing 16 via Cardan shaft 12. A transmission shaft 18 of the transmission drives hydraulic supply pump 20 and air pump 26 via gear pair 22, 24.

The transmission can be a power shift transmission or an infinitely variable, hydraulic, mechanical power split transmission, such as is being increasingly used. Supply pump 20 supplies lubrication fluid and coolant fluid to transmission components, such as couplings and bearings (not shown) symbolically indicated by throttle 28 in pressure line 29.

Rear axle housing or differential housing 30 is flanged onto transmission housing 16, through which rear axle housing or differential housing transmission shaft 18 extends in order to drive power take-off shaft 31. A main shaft 34 extends through dividing wall 32 between transmission housing 16 and differential housing 30 and carries a conical gear wheel 36 which drives spur bevel gear 38 of the differential transmission.

Vent 39 is located in the upper area of differential housing 30 so that the interior of the differential housing is at atmospheric pressure. The lower area of differential housing 30 serves as storage container 40 for hydraulic fluid, especially for lubrication fluid and coolant fluid. The fluid level in storage container 40 can be monitored by gauge rod 42 which extends into differential housing 30. Instead of the gauge rod, other means for monitoring the filling level can also be used, such as a gauge glass or an electric filling-level monitoring.

Shaft supports 44, 46, 48 for shafts entering into and exiting from transmission housing 16 are sealed. The lower collection area of the transmission, which is enclosed by transmission housing 16 and in which the lubrication fluid and coolant fluid collect, communicates via conduit 50 with storage container 40 of differential housing 30. Other than conduit 50, the interior of transmission housing 16 is substantially sealed on all sides. Supply pump 20 receives fluid from storage container 40 via supply line 52.

Air pump 26 draws air from differential housing 30 via a suction line 54 which is positioned above fluid level 56 in differential housing 30, compresses the air and pumps the air into transmission housing 16. As a result, an overpressure builds up in transmission housing 16. This pressure forces the lubrication fluid and coolant fluid collecting at the bottom via communication conduit 50 into differential housing 30. This prevents transmission parts from being immersed in fluid and causing churn losses.

When transmission shaft 18 is rotating, it drives air pump 26 so that the overpressure in transmission housing 16 is maintained. When transmission shaft 18 is at rest, no more compressed air is pumped into transmission housing 16. However, the overpressure in transmission housing 16 is reduced only slowly on account of the extensive sealing off of transmission housing 16 so that only a gradual fluid exchange takes place between transmission housing 16 and differential housing 30, during which fluid flows out of storage container 40 via communication conduit 50 into transmission housing 16. As a result, fluid level 56 in differential housing 30 drops only slowly to a final level, and a reliable check of the filling level cannot take place until after a rather long time.

In order to make a more rapid exchange of fluid possible when the transmission is at rest so that a reliable check of the filling level can be performed after a short time, two shutoff devices are provided to rapidly vent the transmission housing 16 with the transmission at rest.

According to FIG. 1, the upper area of transmission housing 16 and the upper area of differential housing 30 communicate with one another via pressure-release conduit 60. Valve 62 is arranged in conduit 60. The valve 62 communicates via line 64 and line 29 to the supply pressure of supply pump 20 which urges the valve 62 into a closed position. Return spring 66 urges valve 62 into an open position which is shown in FIG. 1.

When transmission shaft 18 rotates and drives supply pump 20, a pressure builds up in pressure line 29 and line 64 that moves valve 62 against the force of spring 66 out of its open position and into its closed position and venting of transmission housing 16 via conduit 60 is prevented.

If engine 10 is turned off so that transmission shaft 18 stops rotating, supply pump 20 builds up no pressure and that pressure line 29 and line 64 become unpressurized. The valve 62 is moved to its open position by return spring 66. The compressed air can now escape out of transmission housing 16 via conduit 60 into differential housing 30 and from the latter via vent 39 into the ambient environment. At the same time, a fluid flows from storage container 40 into transmission 16 via conduit 50. As a consequence of the relatively large cross section of conduit 60, the pressure reduction and the fluid exchange take place relatively rapidly so that a monitoring of fluid with the aid of gauge rod 42 can take place a short time after the turning off of internal combustion engine 10 and the stopping of transmission 18.

Referring now to FIG. 2, conical gear wheel transmission 70 and hydraulic pump 72 are located in differential housing 30, and are driven by transmission shaft 18. Hydraulic pump 72 draws hydraulic fluid out of storage container 40 and into line 74 which provides fluid to work devices 76. U-shaped return line 78 branches off from line 74, runs up out of differential housing 30 and includes a substantially vertical fall line 80 which opens back into differential housing 30. A throttle or restriction 82 limits the flow of fluid through return line 78. A pressure-release conduit 84 communicates with an upper area of transmission housing 16 and extends generally horizontally to the fall line 80. A throttle 86, preferably a 1 mm throttle, is formed at the mouth of conduit 84.

The opening and closing of the pressure-release conduit 84 with respect to air flow is controlled by the fluid current or fluid barrier in fall line 80. When the transmission is running, fluid flowing from pump 72 through the return line 78 and the fall line 80 blocks the pressure-release conduit 84 and prevents air from venting from the transmission housing 16. When the transmission is not operating, this fluid flow is absent, and air can flow out of housing 16 via conduit 84 and line 80. Since line 80 empties into the vehicle axle housing 40, the transmission housing 16 is vented to the vehicle axle housing 40.

When the internal combustion engine 10 is running, transmission shaft 18 drives hydraulic pump 72, so that fluid flows through return line 78 and fall line 80 back into differential housing 30. This flow of fluid in line 80 past throttle 86 prevents air from communicating from line 84 to differential housing 30. No pressure compensation can occur between transmission housing 16 and differential housing 30 via pressure-release conduit 84.

If the engine 10 is turned off, hydraulic pump 72 also stops operating and delivers no fluid through return line 78 and fall line 80. This opens the mouth of conduit 84 so that a pressure compensation can take place from the transmission housing 16 via conduit 84 and fall line 80 into differential housing 30 and from there via vent 39 to the environment. A relatively rapid pressure compensation and fluid compensation also takes place in this embodiment, so that a reliable monitoring of the fluid level can take place shortly after the engine 10 has been turned off or transmission shaft 18 stops.

Alternatively, the pressure-release valve could be electrically controlled by connecting it, for example, to the vehicle ignition circuit (not shown) of the drive motor.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

What is claimed is:

1. A pressure-release system for a transmission having a substantially sealed transmission housing through which a transmission shaft extends, the housing forming a collector for collecting transmission fluid, a storage container sealingly coupled to the housing, a storage conduit communicating the collector with the storage container, an overpressure in the transmission housing urging fluid in the collector through the storage conduit and into the storage container, the pressure-release system comprising:

a pressure-release conduit communicating the transmission housing above the collector to the storage container; and a shutoff device for closing the pressure-release conduit when the transmission shaft is rotating and for opening the pressure-release conduit when the transmission shaft is not rotating.

2. The pressure-release system of claim 1, wherein:

the transmission housing encloses a transmission unit with sealed input and output shafts.

3. The pressure-release system of claim 1, wherein:

the storage container comprises a vehicle axle housing coupled to the transmission housing, the axle housing enclosing an axle differential transmission.

4. The pressure-release system of claim 1, wherein:

an air pump is driven by the transmission shaft, the pump maintaining an overpressure in the transmission housing.

5. The pressure-release system of claim 1, wherein:

the pressure-release conduit includes substantially horizontal conduit joined to a substantially vertical fall line, and fluid flowing through the fall line operating to close the pressure-release conduit.

6. The pressure-release system of claim 5, wherein:

the fall line is supplied with fluid from a hydraulic pump driven by the transmission shaft.

7. The pressure-release system of claim 6, wherein:

the hydraulic pump supplies fluid to a hydraulic function via a supply line, the fall line being communicated with the supply line.

8. The pressure-release system of claim 1, further comprising:

a pressure-release valve for opening and closing the pressure-release conduit, the pressure-release valve closing when the transmission shaft is rotating and the pressure-release valve opening when the transmission shaft is not rotating.

9. The pressure-release system of claim 8, wherein:

the pressure-release valve closes in response to a supply pressure in the transmission, and a return spring opens the pressure-release valve when supply pressure is absent.

10. The pressure-release system of claim 8, wherein:

a hydraulic supply pump is driven by the transmission shaft, the supply pump communicating fluid pressure to the pressure-release valve.

11. The pressure-release system of claim 1, wherein:

a vehicle axle housing is joined to the transmission housing, and the pressure-release conduit communicates the transmission housing with the axle housing.

* * * * *